United States Patent [19]
Sedlmayr

[11] Patent Number: 5,347,433
[45] Date of Patent: Sep. 13, 1994

[54] COLLIMATED BEAM OF LIGHT AND SYSTEMS AND METHODS FOR IMPLEMENTATION THEREOF

[76] Inventor: Steven R. Sedlmayr, 1948 Ellis, Mesa, Ariz. 85028

[21] Appl. No.: 898,951

[22] Filed: Jun. 11, 1992

[51] Int. Cl.$^5$ .......................... F21V 13/04; F21V 8/00
[52] U.S. Cl. ...................................... 362/32; 362/268; 362/299; 362/302
[58] Field of Search ................. 362/32, 268, 298, 299, 362/300, 302

[56] References Cited

U.S. PATENT DOCUMENTS

| | | | |
|---|---|---|---|
| 3,241,440 | 3/1966 | Kugler | 362/299 |
| 3,427,447 | 2/1969 | Clark | 362/299 |
| 3,512,868 | 5/1970 | Gorklewiez et al. | 350/157 |
| 3,588,324 | 6/1971 | Marie | 178/5 |
| 3,697,675 | 10/1972 | Beard et al. | 358/91 |
| 4,127,322 | 11/1978 | Jacobson et al. | 353/31 |
| 4,151,549 | 4/1979 | Bautze | 358/3 |
| 4,191,456 | 3/1980 | Hong et al. | 353/31 |
| 4,241,382 | 12/1980 | Daniel | 362/300 |
| 4,295,153 | 10/1981 | Gibson | 358/3 |
| 4,295,159 | 10/1981 | Carollo et al. | 358/22 |
| 4,323,920 | 4/1982 | Collender | 358/88 |
| 4,376,950 | 3/1983 | Brown et al. | 358/90 |
| 4,425,028 | 1/1984 | Gagnon et al. | 359/246 |
| 4,460,939 | 7/1984 | Murakami et al. | 362/300 |
| 4,461,542 | 7/1984 | Gagnon | 359/41 |
| 4,464,018 | 8/1984 | Gagnon | 359/41 |
| 4,464,019 | 8/1984 | Gagnon | 359/66 |
| 4,497,015 | 1/1985 | Konno et al. | 362/268 |
| 4,500,172 | 2/1985 | Gagnon et al. | 359/41 |
| 4,523,226 | 6/1985 | Lipton et al. | 358/88 |
| 4,541,007 | 9/1985 | Nagata | 358/3 |
| 4,544,237 | 10/1985 | Gagnon | 359/41 |
| 4,611,889 | 9/1986 | Buzak | 359/48 |
| 4,613,207 | 9/1986 | Fergason | 359/41 |
| 4,641,178 | 2/1987 | Street | 358/3 |
| 4,647,966 | 3/1987 | Phillips et al. | 358/88 |
| 4,649,425 | 3/1987 | Pund | 358/88 |
| 4,650,286 | 3/1987 | Koda et al. | 359/41 |
| 4,668,077 | 5/1987 | Tanaka | 355/30 |
| 4,671,634 | 6/1987 | Kizaki et al. | 353/122 |
| 4,687,301 | 8/1987 | Ledebuhr | 359/634 |
| 4,690,526 | 9/1987 | Ledebuhr | 353/31 |
| 4,693,557 | 9/1987 | Fergason | 359/41 |
| 4,699,498 | 10/1987 | Naemura et al. | 346/160 |
| 4,715,684 | 12/1987 | Gagnon | 359/40 |
| 4,736,246 | 4/1988 | Nishikawa | 358/88 |
| 4,739,396 | 4/1988 | Hyatt | 358/60 |
| 4,749,259 | 6/1988 | Ledebuhr | 359/41 |
| 4,769,750 | 9/1988 | Matsumoto et al. | 362/268 |
| 4,770,525 | 9/1988 | Umeda et al. | 353/122 |
| 4,772,098 | 9/1988 | Ogawa | 359/40 |
| 4,772,943 | 9/1988 | Nakagawa et al. | 358/92 |
| 4,786,146 | 11/1988 | Ledebuhr et al. | 359/39 |
| 4,787,013 | 11/1988 | Sugino et al. | 362/32 |
| 4,799,763 | 1/1989 | Davis et al. | 359/472 |
| 4,807,024 | 2/1989 | McLaurin et al. | 358/88 |
| 4,824,210 | 4/1989 | Shimazaki | 359/41 |
| 4,824,214 | 4/1989 | Ledebuhr | 359/39 |
| 4,826,311 | 5/1989 | Ledebuhr | 353/31 |
| 4,834,473 | 5/1989 | Keyes, IV et al. | 395/275 |

(List continued on next page.)

*Primary Examiner*—Richard R. Cole
*Attorney, Agent, or Firm*—Duane Burton

[57] ABSTRACT

A method and system for producing a collimated beam of light having a substantially uniform flux density across the entire beam includes a light source adapted to emit light rays; a light integrator adapted to collimate the light rays and provide a uniform flux intensity; and a pair of reflectors adapted to reflect all of the light from the light source into the light integrator. The light integrator includes a fly-eye arrangement of light pipes. Each light pipe includes a pair of lenses adapted to bend the light rays towards the normal to collimate the light rays. In addition the light pipes may be juxtaposed to produce a collimated light beam having a uniform flux density and a desired geometrical configuration (i.e. rectangular, circular).

20 Claims, 3 Drawing Sheets

U.S. PATENT DOCUMENTS

| | | | |
|---|---|---|---|
| 4,836,649 | 6/1989 | Ledebuhr et al. | 359/41 |
| 4,842,374 | 6/1989 | Ledebuhr | 359/40 |
| 4,850,685 | 7/1989 | Kamakura et al. | 359/634 |
| 4,851,901 | 7/1989 | Iwasaki | 358/88 |
| 4,853,764 | 8/1989 | Sutter | 358/3 |
| 4,861,142 | 8/1989 | Tanaka et al. | 359/41 |
| 4,864,390 | 9/1989 | McKechnie et al. | 358/60 |
| 4,870,486 | 9/1989 | Nakagawa et al. | 358/92 |
| 4,872,750 | 10/1989 | Morishita | 353/7 |
| 4,875,064 | 10/1989 | Umeda et al. | 353/78 |
| 4,877,307 | 10/1989 | Kalmanash | 359/465 |
| 4,904,061 | 2/1990 | Aruga | 359/40 |
| 4,907,860 | 3/1990 | Noble | 359/42 |
| 4,909,601 | 3/1990 | Yajima et al. | 359/48 |
| 4,911,547 | 3/1990 | Ledebuhr | 353/31 |
| 4,913,529 | 4/1990 | Goldenberg et al. | 359/49 |
| 4,918,583 | 4/1990 | Kudo et al. | 366/268 |
| 4,920,298 | 4/1990 | Hinotani et al. | 313/493 |
| 4,922,336 | 5/1990 | Morton | 358/88 |
| 4,928,123 | 5/1990 | Takafuji | 353/20 |
| 4,933,755 | 6/1990 | Dahl et al. | 358/88 |
| 4,935,758 | 7/1990 | Miyatake et al. | 353/31 |
| 4,936,656 | 7/1990 | Yamashita et al. | 359/49 |
| 4,936,657 | 6/1990 | Tejima et al. | 359/40 |
| 4,936,658 | 6/1990 | Tanaka et al. | 359/40 |
| 4,943,154 | 7/1990 | Miyatake et al. | 353/31 |
| 4,943,155 | 7/1990 | Cross, Jr. | 353/33 |
| 4,945,408 | 7/1990 | Medina | 358/88 |
| 4,954,890 | 9/1990 | Park | 358/88 |
| 4,957,351 | 9/1990 | Shioji | 359/94 |
| 4,959,641 | 9/1990 | Bass et al. | 340/700 |
| 4,962,422 | 10/1990 | Ohtomo et al. | 358/88 |
| 4,963,959 | 10/1990 | Drewlo | 358/88 |
| 4,978,888 | 12/1990 | Anandan et al. | 315/58 |
| 4,995,702 | 2/1991 | Aruga | 359/40 |
| 4,995,718 | 2/1991 | Jachimowicz et al. | 353/31 |
| 5,028,121 | 7/1991 | Baur et al. | 359/40 |
| 5,048,949 | 9/1991 | Sato et al. | 353/77 |
| 5,060,058 | 10/1991 | Goldenberg et al. | 358/60 |
| 5,117,312 | 5/1992 | Dolan | 362/298 |
| 5,142,387 | 8/1992 | Shikama et al. | 362/298 |

COLLIMATED BEAM OF LIGHT AND SYSTEMS AND METHODS FOR IMPLEMENTATION THEREOF

FIELD OF THE INVENTION

This invention relates to a method and system for producing a collimated beam of light having substantially uniform flux intensity across substantially the entire beam, and in particular its usage in a geometrically shaped beam to be used for optical projection systems.

BACKGROUND OF THE INVENTION

In particular, image display systems such as video projectors utilize liquid crystal devices (LCD) acting as a programmable electromagnetic wave (EMW) field vector orientation rotating device ("PEMFVORFD") for displaying a projected image. A PEMFVORD for a video projector is typically formed as a LCD having a matrix of individual cells or pixels (picture elements) arranged in a checkerboard array. In general, the LCD is placed in a polarized (a single orientation of the electromagnetic wave electric field vector) light path and control is effected by altering the optical transmission characteristics (i.e., the birefringence) for each cell by the response to an applicable stimulus. The individual cells alter the polarization (change by rotating the polarization state or orientation of the electromagnetic wave electric field vector) of the individual cells or pixels according to the information that is desired to be finally portrayed as the projected image. The resolution of the projected image depends upon several factors, including the number of cells in the LCD. A display of 320 horizontal pixels by 240 vertical pixels will have a generally rectangular peripheral shape and yield a display of 76,800 pixels. A typical television set for the United States market is composed of 115,000 pixels (i.e., combination of red, blue and green dots in a television receiver). A light aperture for admitting light to the array of cells for the display generally is of a rectangular shape. Thus, it is important that the illumination is evenly distributed over a predetermined shape with a large degree of efficiency.

A LCD cell includes a liquid crystal material that is contained between two transparent plates.

A twisted nematic LCD cell requires the light incident at the LCD cell to be of even illumination so that the picture to be eventually displayed has an even illumination, especially important because of the large format of the picture that is eventually displayed. The polarized light for a typical projector is generally derived from a randomly polarized light source that is collimated.

The development of PEMFVORD technology has resulted in the development of LCD projectors which utilize one or more LCDs to alter the orientation of the electric field vector of the light being projected. A typical liquid crystal light valve ("LCLV") projector includes a source lamp which is used to generate a light beam that is directed through a polarizer. This polarized light is directed through the LCDs to change the polarization according to the image to be displayed. The light, after exiting the LCD, passes through a plastic polarizer analyzer which stops and absorbs the unwanted portion of light. The formed image is then enlarged with a projection lens system for forming an enlarged picture on a display screen. Any type of divergence in the light causes a loss in the brightness of the projectors, as this light does not pass through all of the optical components in the system as is not used for the final display, and must be removed through one of several methods.

Color LCLV projectors typically include color separating apparatus such as a prism, beam splitters or dichroic mirrors to separate collimated white light beams from the light source into three primary color beams, i.e., red, green and blue beams. The red, green and blue beams are then individually modulated by LCDs and combined by separate optical apparatus such as combining prisms, mirrors or lenses.

In general, the quality and brightness of the projected image in any liquid crystal light valve (LCLV) projector is a function of the brightness of the source for illuminating the LCDs and the polarizing means. Polarizing optics must be utilized to filter/separate the white light into light with a single orientation of the electric field vector. The white light emitted from the source is thus only partially utilized (i.e., one direction of polarization) in most LCLV projection systems. This requires oversized light sources to achieve a desired brightness at the viewing screen.

Moreover, the unused portion of light from the light source is absorbed and generates wasted energy in the form of heat and transfers this heat to other components (i.e., LCDs, electronics, etc.) and hence is detrimental to the system. This heat must be either shielded and/or dissipated from the components of the system, or else, the light source must be reduced in light output so that the amount of light being absorbed is below the threshold of permanent damage to the components.

Representative prior art LCLV projectors are disclosed in U.S. Pat. No. 5,060,058 to Goldenberg, et al, U.S. Pat. No. 5,048,949 to Sato, et al., U.S. Pat. No. 4,995,702 to Aruga, et al., U.S. Pat. No. 4,943,154 to Miyatake, et al., U.S. Pat. No. 4,936,658 to Tanaka, et al., U.S. Pat. No. 4,936,656 to Yamashita, et al., U.S. Pat. No. 4,935,758 to Miyatake, et al., U.S. Pat. No. 4,911,547 to Ledebuhr, U.S. Pat. No. 4,909,601 to Yajima, et al., U.S. Pat. No. 4,904,061 to Aruga, et al., U.S. Pat. No. 4,864,390 to McKechnie, U.S. Pat. No. 4,861,142 to Tanaka, et al., U.S. Pat. No. 4,850,685 to Kamakura, U.S. Pat. No. 4,842,374 to Ledebuhr, U.S. Pat. No. 4,836,649 to Ledebuhr, et al., U.S. Pat. No. 4,826,311 to Ledebuhr, U.S. Pat. No. 4,786,146 to Ledebuhr, U.S. Pat. No. 4,772,098 to Ogawa, U.S. Pat. No. 4,749,259 to Ledebuhr, U.S. Pat. No. 4,739,396 to Hyatt, U.S. Pat. No. 4,690,526 to Ledebuhr, U.S. Pat. No. 4,687,301 to Ledebuhr, U.S. Pat. No. 4,650,286 to Koda, et al., U.S. Pat. No. 4,647,966 to Phillips, et al., U.S. Pat. No. 4,544,237 to Gagnon, U.S. Pat. No. 4,500,172 to Gagnon, U.S. Pat. No. 4,464,019 to Gagnon, U.S. Pat. No. 4,464,018 to Gagnon, U.S. Pat. No. 4,461,542 to Gagnon, U.S. Pat. No. 4,425,028 to Gagnon, U.S. Pat. No. 4,191,456 to Hong, et al., U.S. Pat. No. 4,127,322 to Jacobson, et al., U.S. Pat. No. 4,588,324, to Marie, U.S. Pat. No. 4,943,155 to Cross, Jr., U.S. Pat. No. 4,936,657 to Tejima, et al., U.S. Pat. No. 4,928,123 to Takafuji, U.S. Pat. No. 4,922,336 to Morton, U.S. Pat. No. 4,875,064 to Umeda, U.S. Pat. No. 4,872,750 to Morishita, U.S. Pat. No. 4,824,210 to Shimazaki, U.S. Pat. No. 4,770,525 to Umeda, et al., U.S. Pat. No. 4,715,684 to Gagnon, U.S. Pat. No. 4,699,498 to Naemura, et al., U.S. Pat. No. 4,693,557 to Fergason, U.S. Pat. No. 4,671,634 to Kizaki, et al., U.S. Pat. No. 4,613,207 to Fergason, U.S. Pat. No. 4,611,889 to Buzak, U.S. Pat. No. 4,295,159 to Carollo, et al.

Prior art illumination systems for overcoming problems with the brightness of LCD display illumination systems have not been completely successful.

An example of an illumination system that attempts to utilize the full output of a light source for increasing the brightness of an LCD display is disclosed in U.S. Pat. No. 5,028,121 to Baur, et al. In the Baur system, the randomly polarized light source is resolved into two separate polarized beams, with one of the polarized beams passed to a dichroic color splitter that then directs the segregated color beams to a set of reflecting LCDs, while the other beam of different polarization is sent to a different set of LCDs through a different dichroic splitter. After having each respective portion of the beams' electric field vector altered, the beam is then reflected back through the dichroic mirrors into the polarizing beam splitter/combiner. The picture to be represented is sent to the projection lens, while the rejected beam is sent back into the light source. This causes the light source to heat and have a shortened life span. Furthermore, each sequential field to be projected has a different brightness level illuminating each pixel, depending upon the amount of light that is rejected back into the light source.

For example, if a light source has an average output of 1000 lumens and the sequential field to be projected has an average brightness level of 30%, then 700 lumens would be reflected back into the light source, making the light emitted from the source to be an effective 1700 lumens. In the next sequential field, if the average brightness level is 50%, then 500 lumens would be reflected back into the light source, making the light emitted from the source to be an effective 1500 lumens. This can be alleviated by computing the average brightness level to be projected, and then modulating the brightness level of the light source when the field is changed for projection so that the illumination of a pixel is at a constant brightness. This system can further be modified by (or be a stand alone system) that would monitor the light output of the light source and change the driving circuitry of the light source to maintain a constant brightness level. This can be monitored by a light transducer that monitors the light from a beam splitter, or alternately, can be mounted directly on a LCD panel outside of the picture forming active area. However, the addition of any of the above circuitry further complicates the projector and makes the light source an active part of the system, increasing the cost and complexity of the projector.

Another example of an illumination system that attempts to utilize the output of a light source for increasing the brightness of an LCD display is disclosed in U.S. Pat. No. 4,913,529 to Goldenberg, et al. In the Goldenberg system, a beam of light, from a light source, is split into two orthogonally linear polarized beams. One of the beams is then passed through a device that rotates one of the beams to change its direction of polarization so that there are two beams of the same polarization. The beams of the same polarization are then directed through different faces of a prism, combined by the prism and focused on the LCD devices.

A problem with such a system is that the beams are not collinear. The beams illuminate the polarizer at different angles, causing an area of usable light, and another area of unusable light. The result is that all of the light available is not used. Another obstacle is that it is difficult to align the combined beams with the use of a prism. Yet another complication is that the prism tends to separate the light into separate colors. This detracts from the clarity, brightness and limits the resolution of the projected image. Still another complication is that the performance of polarizers vary with the angle of light illuminating them, causing different polarizations and different color gradations to occur in the beam.

Other systems, such as those disclosed in U.S. Pat. No. 4,824,214 to Ledebuhr, U.S. Pat. No. 4,127,322 to Jacobson, et al., U.S. Pat. No. 4,836,649 to Ledebuhr, et al., and U.S. Pat. No. 3,512,868 to Gorklewiez, et al., also disclose optical layouts for achieving a high brightness in display systems that utilize LCD devices. In general, these systems are relatively complicated and contain numerous components that are large, expensive, and difficult to adjust.

Representative prior art flat fluorescent light sources are disclosed in U.S. Pat. No. 4,978,888 to Anandan, et al. and U.S. Pat. No. 4,920,298 to Hinotani, et al.

Representative prior art light integrators for light sources are disclosed in U.S. Pat. No. 4,918,583 to Kudo, et al., U.S. Pat. No. 4,787,013 to Sugino, et al. and U.S. Pat. No. 4,769,750 to Matsumoto, et al.

Various prior art techniques and apparatus have been heretofore proposed to present 3-D or stereographic images on a viewing screen and they also use a light source, and they also have the same problems as mentioned above. See U.S. Pat. No. 4,955,718 to Jachimowicz, et al., U.S. Pat. No. 4,963,959 to Drewio, U.S. Pat. No. 4,962,422 to Ohtomo, et al., U.S. Pat. No. 4,959,641 to Bess, et al., U.S. Pat. No. 4,957,351 to Shioji, U.S. Pat. No. 4,954,890 to Park, U.S. Pat. No. 4,945,408 to Medina, U.S. Pat. No. 4,936,658 to Tanaka, et al., U.S. Pat. No. 4,933,755 to Dahl, U.S. Pat. No. 4,922,336 to Morton, U.S. Pat. No. 4,907,860 to Noble, U.S. Pat. No. 4,877,307 to Kalmanash, U.S. Pat. No. 4,872,750 to Morishita, U.S. Pat. No. 4,870,486 to Nakagawa, U.S. Pat. No. 4,853,764 to Sutter, U.S. Pat. No. 4,851,901 to Iwasaki, U.S. Pat. No. 4,834,473 to Keyes, et al., U.S. Pat. No. 4,807,024 to McLaurin, et al., U.S. Pat. No. 4,799,763 to Davis, U.S. Pat. No. 4,772,943 to Nakagawa, U.S. Pat. No. 4,736,246 to Nishikawa, U.S. Pat. No. 4,649,425 to Pund, U.S. Pat. No. 4,641,178 to Street, U.S. Pat. No. 4,541,007 to Nagata, U.S. Pat. No. 4,523,226 to Lipton, et al., U.S. Pat. No. 4,376,950 to Brown, et al., U.S. Pat. No. 4,323,920 to Collendar, U.S. Pat. No. 4,295,153 to Gibson, U.S. Pat. No. 4,151,549 to Bautzc, U.S. Pat. No. 3,697,675 to Beard, et al. In general, these techniques and apparatuses involve the display of polarized or color sequential two-dimensional images which contain corresponding right eye and left eye perspective views of three-dimensional objects. These separate images can also be displayed simultaneously in different polarizations or colors. Suitable eyeware, such as glasses having different polarizing or color separating coatings, permit the separate images to be seen by one or the other eye. This type of system is relatively expensive and complicated requiring two separate projectors and is adapted mainly for stereoscopic movies for theaters. U.S. Pat. No. 4,954,890 to Park discloses a representative projector employing the technique of alternating polarization.

Another technique involves a timed sequence in which images corresponding to right-eye and left-eye perspectives are presented in timed sequence with the use of electronic light valves. U.S. Pat. No. 4,970,486 to Nakagawa, et al., and U.S. Pat. No. 4,877,307 to Kalmanash disclose representative prior art stereographic display systems of this type.

BRIEF SUMMARY OF THE INVENTION

This invention relatives to a method and system of producing a collimated beam of light having substantially uniform flux intensity across substantially the entire beam comprising providing a light source, providing a first concave reflecting means having an optical axis, providing a second concave reflecting means having an optical axis and an opening formed therethrough, said opening having an axis positioned such that the optical axis of the second concave reflecting means is substantially coincident with the axis of said opening, providing a light integrator means positioned in the opening of the second concave reflecting means such that the opening is substantially occupied by the light integrator means, whereby the optical axis of the first concave reflecting means is substantially coincident with the optical axis of the second concave reflecting means and a portion of the light emitted by the light source is directed toward the light integrator means positioned in the opening formed in the second concave reflecting means and a substantially part of the remaining portion of the light strikes the second concave reflecting means and is directed back to the first concave reflecting means where the light is directed toward the light integrator means positioned in the opening formed in the second concave reflecting means. The method and system of this invention also relates to providing a first and/or second concave reflecting means each of which has a parabolic or elliptical shape. This invention also relates to a method and system in which the light integrator means has a plurality of parallel optical light pipes, each pipe having a first lens formed on a first end surface and a second end surface, the optical light pipes being formed in a fly-eye arrangement in juxtaposition to each other, the cross-section of the total plurality of the optical light pipes being generally either rectangular or circular in shape. This invention also relates to the use of a lens to receive the light from the light integrator means to further collimate the light beam.

In the accordance with the present invention, a novel system and method for forming a geometrical collimated light beam, which in turn can illuminate a PEMFVORD, a PEMFVORD projector or other devices and apparatus is disclosed. For instance, a flashlight could be built with this system that will have a greatly improved collimated beam, thus producing a brighter and more compact area of illumination. The system and method are particularly useful in projection systems that employ a PEMFVORD having a rectangular peripheral configuration.

Other objects, advantages and capabilities of the present invention will become more apparent as the description proceeds.

DETAILED DESCRIPTION OF THE PREFERRED EMBODIMENTS

For purposes of simplicity, the same number has been used in the various figures to identify the same part.

Optical Integrator

Figure 1:
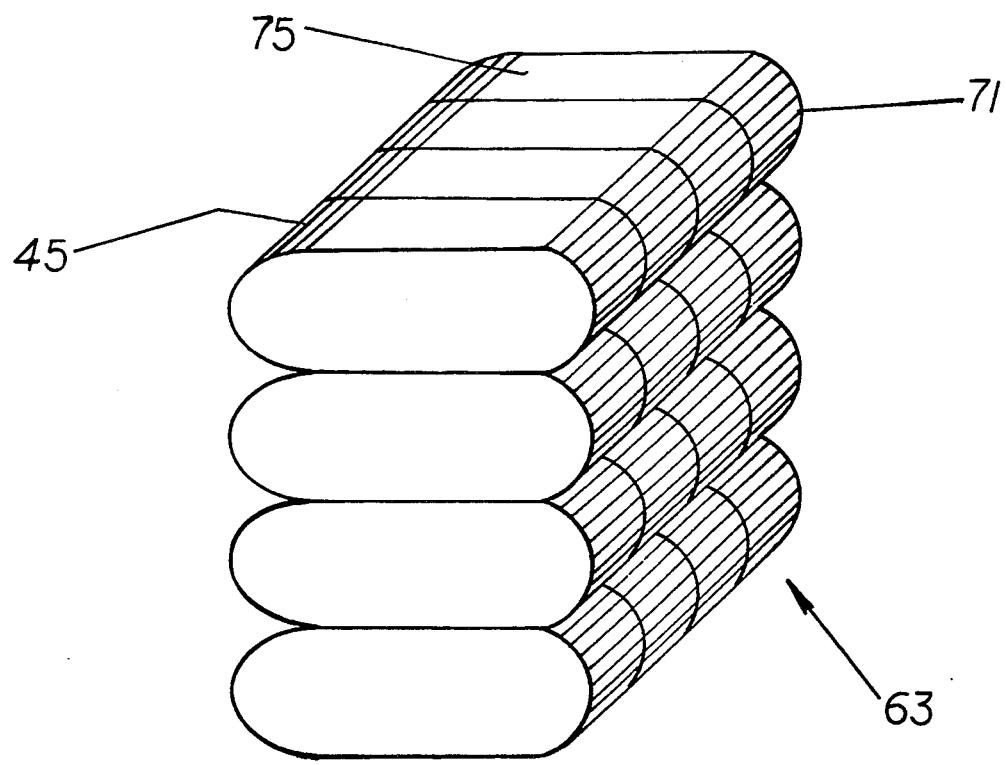
FIG. 1 is a preferred embodiment of an illustrative drawing of a light integrating means used to produce a collimated beam of light.
Figure 1A:
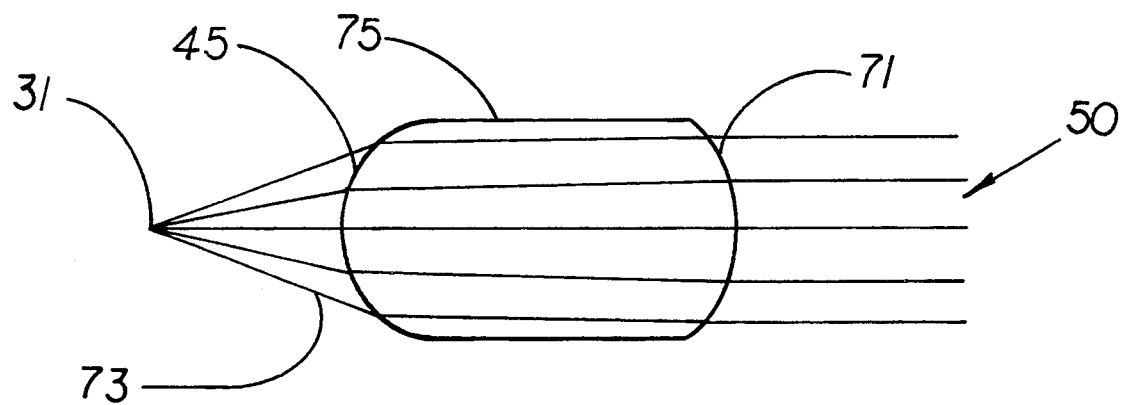
FIG. 1A is a preferred embodiment of an illustrative drawing of a single light pipe of the optical integrator for producing a collimated beam of light, and also shows the optical path of light rays through it.

The optical integrator is made of a plurality of light pipes such as those shown in FIG. 1A, each light pipe being in contact with one or more light pipes surrounding it. Each light pipe consists of a first lens surface 45, a body 75, and a second lens surface 71. As shown in FIG. 1A, a light source 31 emits rays 73 towards a first lens surface 45 which is ground to the predetermined shape required. This first lens surface 45 functions to bend light rays 73 as shown. Body 75 carries the light rays to the second lens surface 71 and has the same index of refraction as the first lens surface 45 and second lens surface 71. This minimizes the number of interfaces the light ray 73 must pass through. Continuing on, light ray 73 strikes the second lens surface 71 which is ground to a predetermined shape, and is again bent as shown. Thus, the light rays exiting second lens surface 71 are substantially collimated. Lens surfaces 45 and 71 may or may not be of the same shape or form and are dependent upon several factors, including, but not limited to, the size of the light source, the shape of the light source, the type of light source, the distance from the light source to the first lens surface 45, the length and size of body 75, the distance of the second lens surface 71 to the target, and other factors known in the trade.

Method for Producing a Collected Beam of Light

Figure 2:
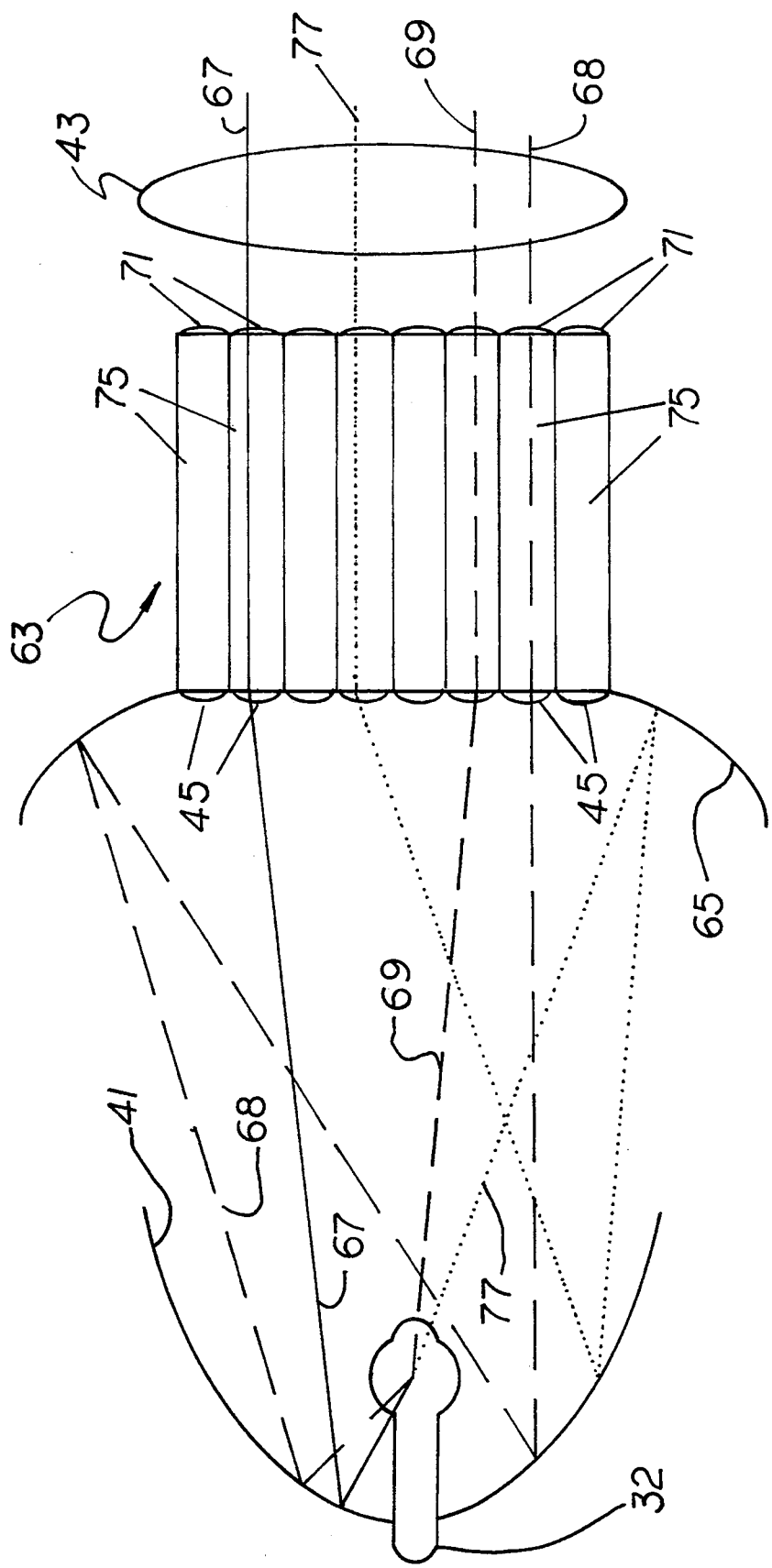
FIG. 2 is an illustrative drawing of a system for producing a collimated beam of light including a light source, a first and second reflecting means, a light integrator means and a collimating means.

FIG. 2 is a preferred embodiment of a light optical integrator/light source/reflector arrangement that provides a new and novel method of providing a collimated light beam with a substantially uniform flux intensity substantially across the entire beam. The way the device operates is as follows:

(1) light is emitted by the light source 32 in a spherical fashion;

(2) portions of the light emitted from the light source will either travel in the forward direction or rearward direction (as viewed in FIG. 2) and behave in the manner of one of the following four cases:

(a) strike the first lens surfaces 45 formed in the first ends of the plurality of light pipes included in the light integrator means 63 as shown by light path 69 in FIG. 2; or (b) strike the second concave reflecting means 65 where the light is reflected from and directed back toward the first concave reflecting means 41 where it is then reflected from and directed toward the light integrator means 63 and strike the first lens surfaces 45 formed on the first ends of the plurality of light pipes included in the light integrator means 63 as shown by light path 77 in FIG. 2; or (c) strike the first concave reflecting means 41 and be reflected toward the light integrator means 63 where it strikes the first lens surfaces 45 formed on the first ends of the plurality of light pipes included in the light integrator means 63 as shown by light path 67 in FIG. 2; or (d) strike the first concave reflecting means 41 where it is reflected from and directed towards the second concave reflecting means 65 where the light is then reflected and directed back toward the first concave reflecting means 41 where it is reflected and directed toward the light integrator means 63 to strike the first lens surfaces 45 formed on the first ends of the plurality of light pipes included in the light integrator means 63 as shown by light path 68 in FIG. 2;

(3) the light striking the first lens surfaces 45 of the plurality of light pipes will be bent according to the angle of entry and lens formula and travel through the body 75 of the light pipe and exit the light pipe through the second lens surface 71 formed on the second end of the light pipe 75; and (4) the light at this time has substantially uniform flux intensity and collimation, and travels to lens 43 for further collimation.

Figure 1B:
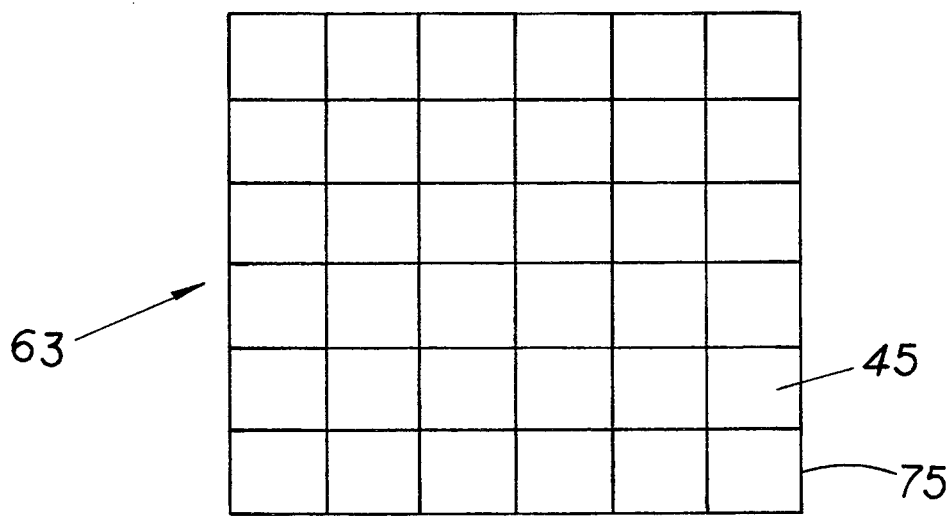
FIG. 1B is an illustrative drawing of a fly-eye arrangement of the light pipes in the optical integrator shaped in a rectangular shape and with the light pipes made in a generally square shape.
Figure 1C:
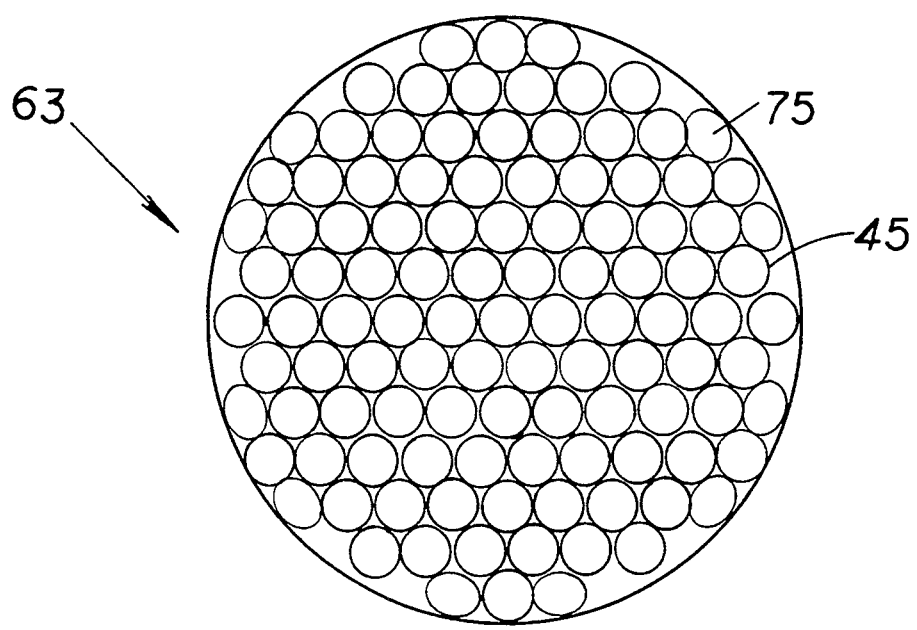
FIG. 1C is an illustrative drawing of a fly-eye arrangement of the light pipes in the optical integrator shaped in a circular shape and with the light pipes made in a circular shape.

The light integrator means 63 is made of a plurality of parallel light pipes such as those shown in FIG. 1A, each light pipe being in contact with one or more adjacent light pipes, see FIG. 1C. Due to spacing configurations, the same light pipes in FIG. 1C will not be in contact with all the surrounding light pipes but preferably contacts one of the adjacent light pipes. Each light pipe consists of a first lens surface 45 formed on a first end thereof, a body 75, and a second lens surface 71 formed on a second end thereof. The first lens surface 45 functions to bend light more towards the normal. Body 75 carries the light to the second lens surface 71 and has the same index of refraction as the first lens surface 45 and second lens surface 71. This minimizes the number of interfaces the light must pass through. Continuing on, light strikes the second lens surface 71 which is ground to a predetermined shape, and is again bent more normal; thus, the light rays exiting from the second lens surface 71 are substantially collimated. Lens surfaces 45 and 71 may or may not be of the same shape or form and are dependent upon several factors, including, but not exclusive to, the size of the light source, the shape of the light source, the type of light source, the distance from the light source to the first lens surface 45, the length and size of body 75, the distance of the second lens surface 71 to the target, and other factors known in the trade.

As shown in FIG. 2, the second concave reflecting means 65 has an opening formed therethrough in which is mounted a light integrator means 63. The light integrator means 63 substantially occupies the opening in said second concave reflecting means 65. The light integrator means 63 has an optical axis that is parallel to and coincident with the optical axis of the second concave reflecting means 65. The cross section of the light integrator means 63 may be either rectangular, circular, elliptical, octagonal, or any desired shape. The shape of the light integrator means is dependent upon the final desired shape of the beam formed exiting from the light integrator means 63.

The first concave reflecting surface means 41 has an optical axis. The light source 32 is mounted along said optical axis. The optical axes of the first and second concave reflecting surface 41 and 65 are parallel to and coincident.

The system of this invention preferably includes a lens 43 positioned to receive the light from the second end of the light integrator means 63. The lens 43 further collimates the light beam from the light integrator means 63.

The first and second concave reflecting means 41 and 65 may be parabolic or elliptical in shape.

The optical light pipes are formed in a fly-eye arrangement in juxtaposition to each other as shown in FIGS. 1, 1B and 1C. The optical light pipes can be of circular, rectangular, octagonal, or any convenient geometrical shape as required by the application intended as shown in FIGS. 1B and 1C.

The light integrator means 63 is well known in prior art, as shown in U.S. Pat. No. 4,918,583 to Kudo, et al., U.S. Pat. No. 4,769,750 to Matsumoto, et al., U.S. Pat. No. 4,497,015 to Konno, et al., U.S. Pat. No. 4,668,077 to Tanaka. These patents are mainly for forming a uniform intensity across a beam of light or ultraviolet for use in integrated circuit manufacturing. However the interaction of the light source, the two reflecting surfaces and the light integrator means is novel.

In order to make the system work properly, the design must take into consideration the light source and its radiation pattern, the first and second surface reflecting means 41 and 65 and the lens surfaces 45, 71 formed respectively on the first and second ends of each light pipe included in the light integrator means 63 and the position of the particular individual light pipe in the matrix of the light integrator means 63. For such analysis, a commercially available computer ray tracing program such as Optics Analyst or Genii-Plus available from Genesse Optics Software, Inc., 3136 Winton Road South, Rochester, N.Y. 14623 or Beam Two, Beam Three, or Beam Four from Stellar Software, P.O. Box 10183, Berkeley, Cal. 94709 can be used in the design of the lens and reflecting means formula for the shapes needed in regard with the particular light source that is chosen.

In light of the previous discussions and further in the description and claims, it will become apparent that the following partial list of the advantages of the invention are: high brightness is easily achieved and brightness is not changed by the reflection of any of the light paths back into the light source; brightness can be easily modified by changing light sources; improved efficiency means lower heat; a high efficiency optical path is utilized and the only significant heating in the optics is due to the light source itself; modifications are simple; optics can accommodate any intensity and variety of light sources; a unique light path provides a rectangular beam; more compact light sources; ease of manufacturing; longevity because of the downsizing of light sources; and increased resolution/brightness.

Thus, the invention provides a collimated light beam which produces a light beam of higher efficiency in brightness. Moreover, in light of the herein described invention, components of the system can be modified or easily adjusted to produce different light beams of different brightness.

While the invention has been particularly shown and described with reference to preferred embodiments thereof, it will be understood by those skilled in the art that various changes in form and details can be made without departing from the spirit and scope of this invention.

What is claimed is:

1. A system of producing a collimated beam of light having a substantially uniform flux intensity across substantially the entire beam, comprising:
   a light source;
   first and second reflecting means arranged on opposite sides of said light source along an optical axis, said second reflecting means including an opening positioned for receiving light from the light source and also from said first concave reflecting means, and said second reflecting means positioned for reflecting light back to said first reflecting means; and
   a light integrating and collimating means including a plurality of light pipes located in said opening and juxtaposed as a fly-eye structure, each of said light pipes including a first lens and a second lens for bending light rays along a path generally parallel to the optical axis.

2. The system as claimed in claim 1 and wherein the fly-eye arrangement has a desired geometrical cross sectional configuration.

3. A method of producing a collimated beam of light having substantially uniform flux intensity across substantially the entire beam, comprising:
   providing a light source;
   providing a first concave reflecting means having an optical axis;
   providing a second concave reflecting means having an optical axis substantially coincident with the optical axis of the first concave reflecting means and positioned for reflecting light from said light source and said first concave reflecting means to said first concave reflecting means and having an opening formed therethrough, said opening having an axis positioned such that the optical axis of the second concave reflecting means is substantially coincident with the axis of the opening; and
   providing a light integrator means positioned in the opening of the second concave reflecting means for receiving light beams from said light source and reflected light beams from said first concave reflecting means said light integrator means adapted for collimating said received beams and providing a substantially uniform flux intensity.

4. A method as described in claim 3 in which the step of providing a first concave reflecting means includes providing a first concave reflecting means having a parabolic shape.

5. A method as described in claim 3 in which the step of providing a first concave reflecting means includes providing a first concave reflecting means having an elliptical shape.

6. A method as described in claim 3 in which the step of providing a second concave reflecting means includes providing a second concave reflecting means having a parabolic shape.

7. A method as described in claim 3 in which the step of providing a second concave reflecting means includes providing a second concave reflecting means having an elliptical shape.

8. A method as described in claim 3 in which the step of providing a light integrator means includes providing a light integrator means having a plurality of parallel optical light pipes, each pipe having a first lens formed on a first end surface and a second lens formed on a second end surface, the optical light pipes being formed in a fly-eye arrangement in juxtaposition to each other.

9. A method as described in claim 8 in which the steps of providing a first and second concave reflecting means includes providing a first and second concave reflecting means each having a parabolic shape.

10. A method as described in claim 8 in which the steps of providing a first and second concave reflecting means includes providing a first and second concave reflecting means each having an elliptical shape.

11. A method as described in claim 3 in which the step of providing a light integrator means includes providing a light integrator means having a plurality of parallel optical light pipes, each pipe having a first lens formed on a first end surface and a second lens formed on a second end surface, the optical light pipes being formed in a fly-eye arrangement in juxtaposition to each other the cross section of the total plurality of optical light pipes having a desired geometrical configuration.

12. A method as described in claim 3 further comprising providing a lens to receive the light from said light integrator means to further collimate the light beam.

13. A system of producing a collimated beam of light having substantially uniform flux intensity across substantially the entire beam, comprising:
    a light source;
    a first concave reflecting means having an optical axis;
    a second concave reflecting means having an optical axis substantially coincident with the optical axis of the first concave reflecting means and positioned for reflecting light from said light source and said first concave reflecting means to said first concave reflecting means and having an opening formed therethrough said opening having an axis, said opening being positioned such that the optical axis of the second concave reflecting means is substantially coincident with the axis of the opening; and
    a light integrator means positioned in the opening of the second concave reflecting means, for receiving light beams from said light source and reflected light beams from said first concave reflecting means said light integrator means adapted for collimating said receiving beams and providing a substantially uniform flux intensity.

14. A system as described in claim 13 in which the first concave reflecting means is formed in a parabolic shape.

15. A system as described in claim 13 in which the first concave reflecting means is formed in an elliptical shape.

16. A system as described in claim 13 in which the second concave reflecting means is formed in a parabolic shape.

17. A system as described in claim 13 in which the second concave reflecting means is formed in an elliptical shape.

18. A system as described in claim 13 in which the light integrator is formed from a plurality of parallel optical light pipes, each light pipe having a first lens formed on a first end surface and a second lens formed on a second end surface, the optical light pipes being formed in a fly-eye arrangement in juxtaposition to each other.

19. A system as described in claim 13 in which the light integrator means is formed from a plurality of parallel optical light pipes, each light pipe having a first lens formed on a first end surface and a second lens formed on a second end surface, the optical light pipes being formed in a fly-eye arrangement in juxtaposition to each other the cross section of the total plurality of optical light pipes having a desired geometrical configuration.

20. A system as described in claim 13 further including a light collimating means, said light collimating means comprising a lens positioned to receive the light from said light integrator means.

* * * * *